US007489363B2

(12) United States Patent
Choi (10) Patent No.: US 7,489,363 B2
(45) Date of Patent: Feb. 10, 2009

(54) METHOD OF SCALING PARTIAL AREA OF MAIN PICTURE

(75) Inventor: Jong In Choi, Anyang-si (KR)

(73) Assignee: LG Electronics Inc, Seoul (KR)

( * ) Notice: Subject to any disclaimer, the term of this patent is extended or adjusted under 35 U.S.C. 154(b) by 812 days.

(21) Appl. No.: 11/005,938

(22) Filed: Dec. 6, 2004

(65) Prior Publication Data
US 2005/0151885 A1 Jul. 14, 2005

(30) Foreign Application Priority Data
Dec. 8, 2003 (KR) ........................ 10-2003-0088701

(51) Int. Cl.
*H04N 1/393* (2006.01)
*H04N 9/74* (2006.01)
(52) U.S. Cl. .................. 348/581; 348/561; 348/564; 348/565; 348/569; 348/704; 345/629; 382/298
(58) Field of Classification Search ............... 348/561, 348/565, 569, 704, 581, 568, 564; 382/298; 345/629, 660, 472; 715/764, 800, 815
See application file for complete search history.

(56) References Cited

U.S. PATENT DOCUMENTS

| | | | | | |
|---|---|---|---|---|---|
| 4,546,349 | A | * | 10/1985 | Prohofsky et al. | 345/667 |
| 5,053,886 | A | * | 10/1991 | Nakajima | 358/451 |
| 5,455,632 | A | * | 10/1995 | Ichihara | 348/565 |
| 5,638,501 | A | * | 6/1997 | Gough et al. | 345/639 |
| 5,949,432 | A | * | 9/1999 | Gough et al. | 345/629 |
| 6,157,414 | A | * | 12/2000 | Sakamoto | 348/581 |
| 6,166,744 | A | * | 12/2000 | Jaszlics et al. | 345/629 |
| 6,493,036 | B1 | * | 12/2002 | Fernandez | 348/561 |
| 6,714,218 | B1 | * | 3/2004 | Bian | 715/764 |
| 6,806,888 | B2 | * | 10/2004 | Bhogal et al. | 345/660 |
| 7,119,850 | B2 | * | 10/2006 | Park | 348/565 |
| 7,133,051 | B2 | * | 11/2006 | Sloo et al. | 345/629 |
| 7,194,697 | B2 | * | 3/2007 | Sinclair et al. | 715/800 |
| 2002/0129382 | A1 | * | 9/2002 | Zhao et al. | 725/137 |
| 2004/0117819 | A1 | * | 6/2004 | Yu | 725/32 |

FOREIGN PATENT DOCUMENTS

CN 1315807 A 10/2001
CN 1452765 A 10/2003

* cited by examiner

*Primary Examiner*—David L Ometz
*Assistant Examiner*—Jean W Désir
(74) *Attorney, Agent, or Firm*—Lee Hong Degerman Kang & Waimey (57) ABSTRACT

The present invention provides a method of scaling a partial area of a main picture, by which the partial area of the main picture can be magnified in a manner of scaling the partial area of the picture displayed on a screen like using a virtual magnifier without employing a separate expensive hardware resource. The present invention comprises a first step of making a main scaler extract image data of the partial area to be scaled from full image data according to prescribed scaling information including magnification/reduction information for the partial area of a display picture, a second step of making a sub-scaler scale the extracted image data of the partial area at a prescribed rate, and a third step of overlaying the scaled image data of the partial area on the full image data provided from the main scaler.

34 Claims, 5 Drawing Sheets

METHOD OF SCALING PARTIAL AREA OF MAIN PICTURE

This application claims the benefit of the Korean Application No. P2003-088701 filed on Dec. 8, 2003, which is hereby incorporated by reference.

BACKGROUND OF THE INVENTION

1. Field of the Invention

The present invention relates to a method of scaling a partial area of a main picture, by which the partial area of the main picture can be magnified in a manner of scaling the partial area of the picture displayed on a screen like using a virtual magnifier without a separate expensive hardware resource.

2. Discussion of the Related Art

Figure 1:
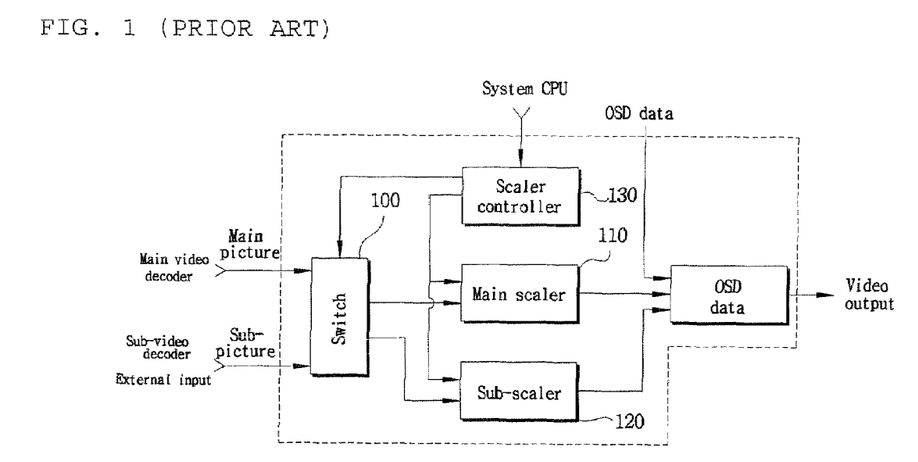
FIG. 1 is a block diagram of a device for scaling a partial area of a picture according to a related art.

Generally, a digital broadcast receiver is provided with a scaling function for magnifying or reducing a partial area of a picture, which is explained with reference to FIG. 1 as follows. FIG. 1 is a block diagram of a device for scaling a partial area of a picture according to a related art.

Referring to FIG. 1, under the control of a scaler controller 130, a main scaler 110 extracts image data of a partial area to be magnified from full screen image data, which is decoded in a main picture decoder and is inputted via a switch 100, according to an externally inputted magnification command and then magnifies the extracted image data by a full screen size or zooms out only the area to be magnified. In case of zooming-out, the rest area is blacked on the screen, which is shown in FIG. 2.

In FIG. 2A, a main picture 200 of a digital broadcast receiver is shown. In FIG. 2B, a partial picture 210 (width: length=dx:dy) of the main picture 200 is magnified by a full-screen size (width:length=dx':dy') of the digital broadcast receiver. In FIG. 2C, a partial picture 210 of the main picture 200, which is magnified like FIG. 2B, is zoomed out by a magnification size (width:length=dx":dy") of the digital broadcast receiver. In doing so, the image data of a background picture 220 is processed by black data.

Figure 2:
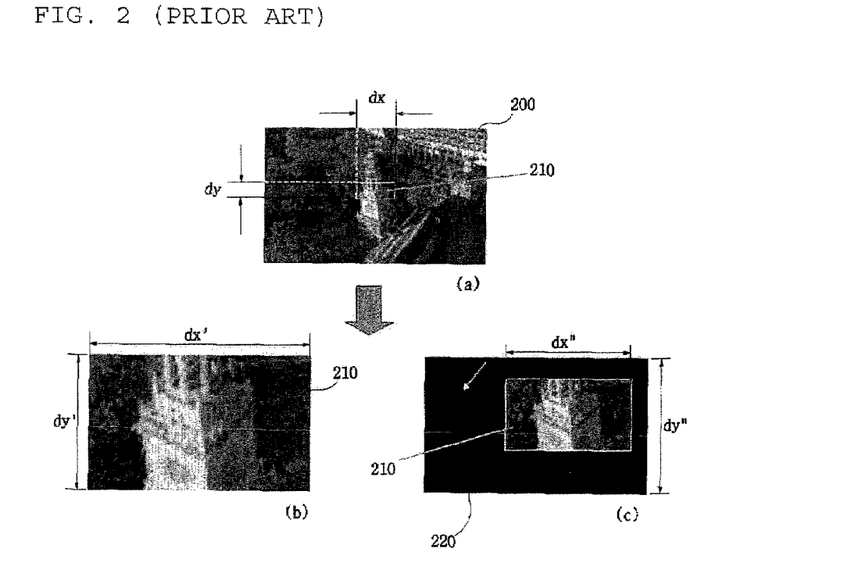
FIGS. 2A to 2C are diagrams of a magnified partial area according to a general method for size adjustment.

Namely, a general method of selecting a partial area of a main picture and magnifying the selected partial area, as shown in FIG. 2, can be carried out in a following manner. First of all, the area to be magnified is displayed by a screen size or is zoomed out to process the rest area by black.

However, it is difficult to implement the partially magnifying function for the data broadcast image in which OSD (on-screen display) data is included, since the magnifying process is completed prior to the execution of the OSD processing. Moreover, in case that a user intends to view the magnified area and the main picture as well with the main picture intact, it is difficult to implement the magnifying function of high grade. Hence, the demand for an enhanced method of magnifying a partial area is on the increase.

SUMMARY OF THE INVENTION

Accordingly, the present invention is directed to a method of scaling a partial area of a main picture that substantially obviates one or more problems due to limitations and disadvantages of the related art.

An object of the present invention is to provide a method of scaling a partial area of a main picture, by which the partial area of the main picture can be magnified in a manner of scaling the partial area of the picture displayed on a screen like using a virtual magnifier without employing a separate expensive hardware resource.

In accordance with the purpose of the invention, magnification or reduction is performed on a specific partial area of a picture by changing a data path within a video processor, controlling the activation of the data path, and using such a hardware resource as a sub-scaler scaling a sub-picture. Hence, the present invention magnifies the partial area of the main picture without employing the separate expensive hardware. Therefore, a user can view the magnified partial area of the main picture, as if a virtual magnifier is used, while viewing the main picture as a full-sized background picture.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of scaling a partial area of a main picture according to the present invention comprises a first step of making a main scaler extract image data of the partial area to be scaled from full screen image data according to prescribed scaling information including magnification/reduction information for the partial area of a display picture, a second step of making a sub-scaler scale the extracted image data of the partial area at a prescribed rate, and a third step of overlaying the scaled image data of the partial area on the full screen image data provided from the main scaler.

In another aspect of the present invention, a method of scaling a partial area of a main picture comprises a first step of making a main scaler extract image data of the partial area to be scaled from full screen image data according to prescribed scaling information including magnification/reduction information for the partial area of a display picture, a second step of deciding that the display picture belongs to which video mode among a plurality of predefined video modes, a third step of making a sub-scaler scale the extracted image data of the partial area at a prescribed rate in a manner of previously setting up a plurality of data paths for inputting the image data to a sub-scaler to correspond to a plurality of the predefined video modes, respectively, selecting one of the data paths to fit a decision result of the second step, and inputting the extracted image data of the partial area to the sub-scaler via the selected data path, and a fourth step of overlaying the scaled image data of the partial area on the full screen image data provided from the main scaler.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, a method of scaling a partial area of a main picture according to a first embodiment of the present invention is explained with reference to FIG. 3 as follows.

First Embodiment

In a first embodiment of the present invention, image data of a partial area to be magnified is extracted by a main scaler. The extracted image data is scaled at a prescribed rate by a conventional sub-scaler. And, the scaled image data is overlaid on the full image data of the original to be externally outputted. Hence, a user can view the main picture of which partial area is magnified, without separate expensive hardware while viewing a main picture as a full background picture.

In extracting the image data of the partial area to be magnified, prescribed scaling information is generated by referring to reference information set up by a user's selection, the partial area to be magnified is sought from the decoded full image data using the generated scaling information, and the image data configuring the partial area is then extracted.

For instance of the reference information, once position information of a spot pointed by a user's selection is inputted, position coordinates as a reference for the partial area magnification of the present invention, which are hereinafter called reference position coordinates, are set up with reference to the inputted position information.

In doing so, the position information of the user-pointing spot is set as the reference position coordinates. Alternatively, in case of intending to use the user-pointing spot as a center point for the partial area magnification, the spot pointed by the user's selection is decided as the center point. And, position coordinates of a spot leaving a distance from the position coordinates of the center point in X-axis and Y-axis directions are computed to be set as the reference position coordinates for the partial area magnification of the present invention.

Once the reference position coordinates are set up, a partial area to be scaled is decided by magnifying the reference position coordinates in X-axis and Y-axis directions at a magnification rate. Image data belonging to the partial area is then extracted from the decoded full image data. The magnification rate is preferably set variable according to a user's setup. Yet, the magnification rate can be previously set fixed.

Thus, the present invention generates the prescribed scaling information by referring to the reference information set up by the user's selection, decides the partial area to be magnified within the decoded full image data, and then extracts the image data corresponding to the partial area. The extracting process is explained in detail with reference to FIG. 3 as follows.

Figure 3:
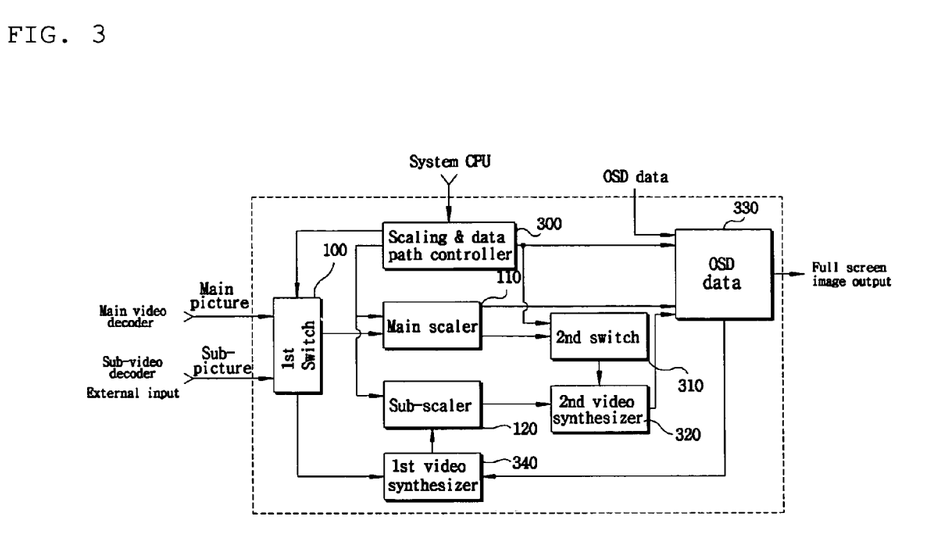
FIG. 3 is a block diagram of an apparatus applicable to the present invention.

Referring to FIG. 3, a system CPU preferentially computes reference position coordinates to be used in partial area magnification by referring to user-setting reference information. Under the control of the system CPU, a scaling & data path controller 300 generates scaling information consisting of reference position coordinates information and magnification rate information and then transfers the scaling information to a main scaler 110.

The main scaler 110 searches a partial area to be magnified according to the scaling information and then extracts image data configuring the partial area.

Namely, the main scaler 110, under the control of the scaling & data path controller 300, extracts the reference position coordinates from the scaling information, decides the partial area to be magnified in a manner of scaling the extracted position coordinates at a magnification rate in X-axis and Y-axis directions, and then extracts the image data belonging to the decided partial area from the full image data inputted via a first switch 100 by being decoded in a video decoder.

Consequently, the image data of the partial area to be magnified can be extracted. For the implementation of the present invention, a sequence of magnifying the extracted image data using the conventional sub-scaler is explained as follows.

First of all, once the image data of the partial area to be magnified is extracted, it is scaled at the magnification rate by the sub-scaler. For this, a predefined data path and modules located on the data path are activated so that the extracted image data of the partial area can pass through the sub-scaler, and the image data of the partial area extracted from the main scaler can pass through the sub-scaler. The sub-scaler then performs scaling on the extracted image data of the partial area at the setup magnification rate.

In doing so, the image data is the scalable information like text font information and the magnification rate is preferably variable according to a user setup, which can be variously modified within the technical scope of the present invention.

The magnifying sequence of the partial area using the sub-scaler is explained in detail with reference to FIG. 3 as follows.

First of all, the scaling & data path controller 300 enables the respective modules located on the corresponding data path so that the extracted image data belonging to the partial area can be inputted to the sub-scaler.

Subsequently, once the main scaler 110 extracts the image data belonging to the partial area and outputs the extracted image data, the extracted image data belonging to the partial area is fed back via an OSD processor 330 to be inputted to the sub-scaler 120 via a first video synthesizer 340. The sub-scaler 120 performs scaling on the inputted image data of the partial area at the prescribed magnification rate under the control of the scaling & data path controller 300.

Meanwhile, full image data of the original, which is decoded in a main video decoder to be inputted via the first switch 100, is outputted to a second video synthesizer 320 via a second switch 310 enabled under the control of the scaling & data path controller 300. The second video synthesizer 320 overlays the image data scaled in the sub-scaler 120 on the full image data of the original outputted via the second switch 310 to be externally outputted via the OSD processor 330.

Preferably, on outputting the image data, graphic objects previously set to direct the partial area are blended with the result of overlaying the image data of the partial area on the full image data of the original via the OSD processor 330, whereby a user can recognize the magnified partial area on the screen with ease.

Thus, without separate expensive hardware, the system applicable to the present invention is able to perform the magnification on the partial area of the specific picture by changing the data path within the video processor, controlling the activation of the data path, and using such a conventional hardware resource as a sub-scaler scaling the sub-picture. In spite of describing the magnifying process only, a reducing process is carried out in the same manner as the magnifying process within the technical scope of the present invention.

A second embodiment of the present invention is also explained with reference to FIG. 3 as follows.

Second Embodiment

In a second embodiment of the present invention, a partial area demanded by a user is magnified using a sub-scaler like the first embodiment of the present invention. Yet, the second embodiment of the present invention differs from the first embodiment of the present invention in that a picture belonging to the partial area is magnified by a different mechanism according to the sort of an image mode.

By considering that video processing is differently carried out according to whether a broadcast image transmitted from a broadcasting station is a normal broadcast image or a data broadcast image including an OSD data and the like, the second embodiment of the present invention carries out a magnifying process with the different mechanism according to the sort of the broadcast image.

For this, in the second embodiment of the present invention, as mentioned in the first embodiment of the present invention, image data configuring a partial area to be magnified is preferentially extracted. Subsequently, a data path corresponding to an image mode of a main picture to which the image data belongs and various modules located on the data path are enabled so that the extracted image data can be inputted to a sub-scaler. The sub-scaler then magnifies the inputted image data at a predetermined magnification rate.

Namely, in the second embodiment of the present invention, the partial area to be magnified is preferentially decided from full image data decoded according to scaling information that is generated by referring to user's setup information. After image data configuring the partial area has been extracted, it is decided that a corresponding broadcast image configuring the extracted image data corresponds to which one of a plurality of predefined image modes. For instance, by deciding whether the corresponding broadcast image belongs to a normal broadcast mode or a data broadcast mode, the extracted image data is inputted to the sub-scaler via the different data path according to a result of the decision. How to decide the sort of the broadcast image mode is known to the public, which is skipped in the following description.

A detailed implementation of the second embodiment of the present invention is explained with reference to FIG. 3 as follows. Referring to FIG. 3, under the control of the system CPU, a scaling & data path controller 300 generates scaling information including reference position coordinates information set up by a user's selection and prescribed fixed magnification rate information and then transfers the scaling information to a main scaler 110. The main scaler 110 extracts image data of a partial area to be scaled according to the scaling information.

Namely, the main scaler 110, under the control of the scaling & data path controller 300, extracts reference position coordinates from the scaling information, sets up the partial area for magnification in a manner of scaling the extracted position coordinates at a previously set magnification rate in X-axis and Y-axis directions, and then extracts the image data belonging to the partial area from full image data inputted via a first switch 100 by being decoded in a video decoder.

Separately, the scaling & data path controller 300 decides that the image data configuring the partial area to be magnified belongs to which one of a plurality of predefined image modes. The scaling & data path controller 300 then selectively enables various modules provided to the corresponding data path according to a result of the decision so that the image data of the partial area extracted from the main scaler 110 can be inputted to the sub-scaler 120.

For instance, if the image data corresponds to the normal broadcast image mode, the scaling & data path controller 300 enables the respective modules on the corresponding data path so that the image data belonging to the normal broadcast image mode can be inputted to the sub-scaler 120.

Subsequently, once the main scaler 110 extracts the image data belonging to the partial area and outputs the extracted image data, the extracted image data belonging to the partial area is fed back via an OSD processor 330 to be inputted to the sub-scaler 120 via a first video synthesizer 340. The sub-scaler 120 performs scaling on the inputted image data of the partial area at the prescribed magnification rate under the control of the scaling & data path controller 300.

And, full image data of the original, which is decoded in a main video decoder to be inputted via the first switch 100, is outputted to a second video synthesizer 320 via a second switch 310 enabled under the control of the scaling & data path controller 300. The second video synthesizer 320 overlays the image data scaled in the sub-scaler 120 on the full image data of the original outputted via the second switch 310 to be externally outputted via the OSD processor 330.

Preferably, on outputting the image data, graphic objects previously set to direct the partial area are blended with the result of overlaying the image data of the partial area on the full image data of the original via the OSD processor 330, whereby a user can recognize the magnified partial area on the screen with ease.

On the other hand, for another instance, if the main picture is a prescribed data broadcast video including OSD (on-screen display), the scaling & data path controller 300 enables the respective modules on the previously set corresponding data path of the data broadcast video and the main scaler 110 extracts the image data belonging to the partial area to be magnified from the full image data outputted from the second switch 310 and then outputs the extracted image data to the OSD processor 330.

Subsequently, the image data belonging to the partial area to be magnified is blended with a prescribed OSD picture included in the data broadcast video via the OSD processor 330 and the blended data is then inputted to the sub-scaler 120. Like the first embodiment of the present invention, the image data belonging to the partial area is scaled at the magnification rate by the sub-scaler 120 and the scaled image data is then outputted externally via the OSD processor 330.

Figure 4:
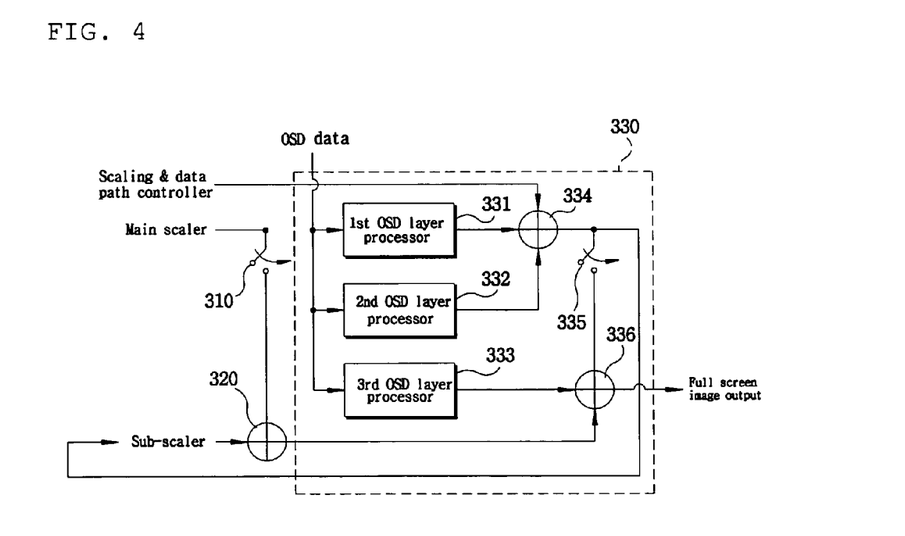
FIG. 4 is a detailed block diagram of an OSD processor in FIG. 3.

The OSD processor 330 is explained with reference to FIG. 4 for example. FIG. 4 is a detailed block diagram of the OSD processor in FIG. 3 for explaining data path change and enabled operations of the respective modules provided to the data path.

In case that a main picture for magnification corresponds to the normal broadcast image, an operation of the OSD processor used in the present invention is explained as follows.

First of all, under the control of the scaling & data path controller, the second switch 310 is turned on to input the full image data, which belongs to the normal broadcast image of the original outputted from the main scaler, to the second video synthesizer 320. And, the image data of the partial area to be magnified is transferred to the sub-scaler via a mixer 334 so that the sub-scaler can perform scaling on the corresponding area. And, the scaled data of the corresponding area is inputted to the second video synthesizer 320 as well. In doing so, a switch 335 is turned off.

Subsequently, the normal broadcast image of the original and the image data of the partial area to be magnified are synthesized by the second video synthesizer 320 to be outputted via a mixer 336 built in the OSD processor 330. As a result, a user is able to view the main picture of which partial area is magnified on a display screen. Preferably, in the present invention, a third OSD layer processor 333 is made to perform OSD processing on such a simple graphic object as a prescribed icon and the OSD-processed graphic object is synthesized with the main picture of which partial area is magnified. Hence, it is facilitated for a user to recognize the magnified area.

In case that the main picture to be magnified corresponds to the data broadcast image, an operation of the OSD processor used in the present invention is explained as follows.

First of all, under the control of the scaling & data path controller, the image data belonging to the partial area to be magnified is inputted to the mixer 334 and is then synthesized with OSD image data which is processed at and outputted from first and second OSD layer processors 331 and 332. The synthesized data is directly transferred to the sub-scaler so that the corresponding area can be scaled by the sub-scaler. The scaled data is then inputted to the mixer 336.

Secondly, the data broadcast image of the original, which is generated from synthesizing the OSD image data processed and outputted via the first and second OSD layer processors 331 and 332 with the image data outputted from the main scaler via the mixer 334, is inputted to the mixer 336 to be synthesized with the partial area of the main picture scaled by the sub-scaler. Hence, it is able to externally output the data broadcast image of which partial area is magnified.

A method of scaling a partial area of a main picture according to a preferred embodiment of the present invention is explained with reference to FIG. 5 as follows.

Figure 5:
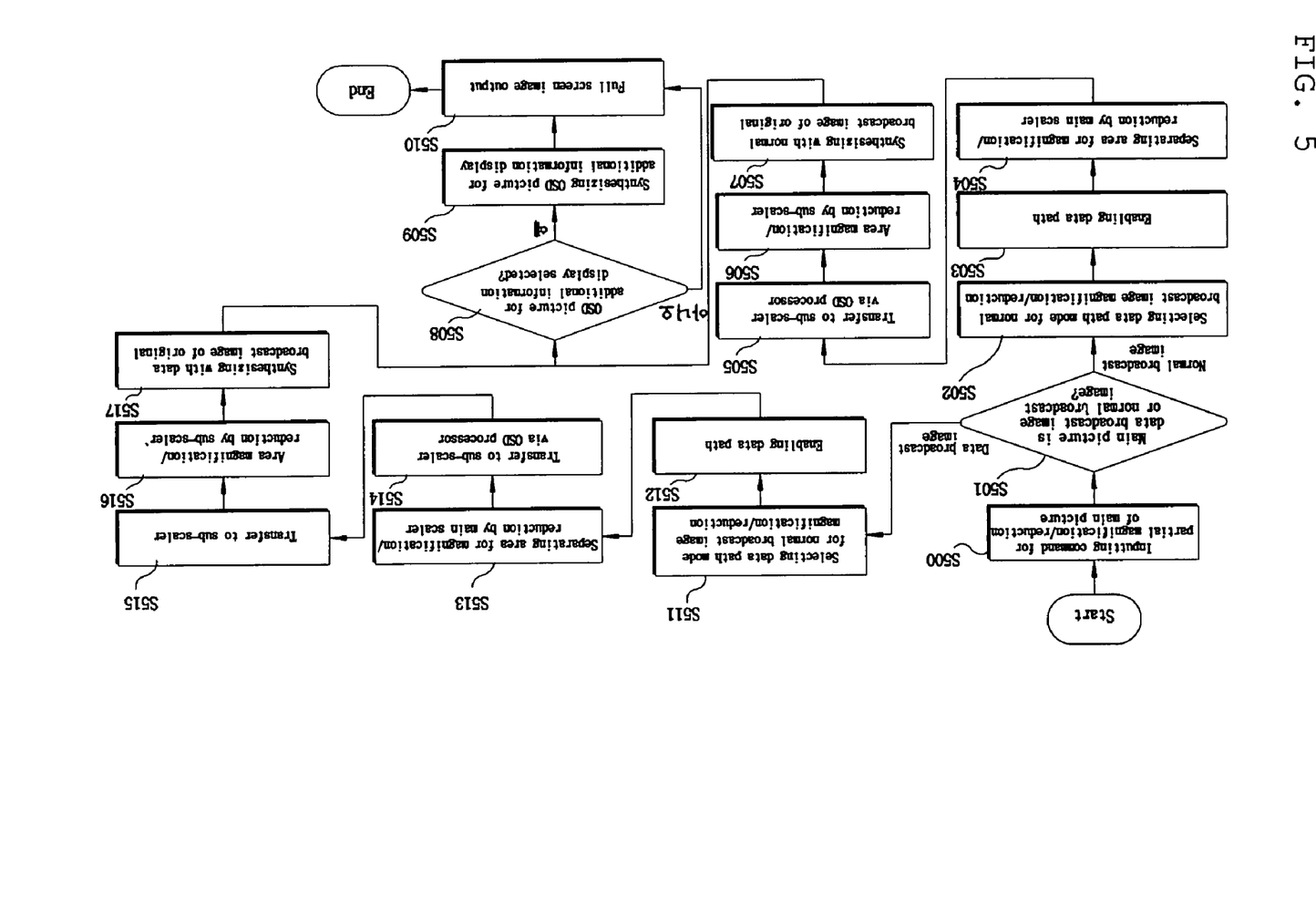
FIG. 5 is a flowchart of a method of scaling a partial area of a main picture according to the present invention.

FIG. 5 is a flowchart of a method of scaling a partial area of a main picture in a digital broadcast receiver according to the present invention.

First of all, prior to performing magnification on a partial area of a main picture in a sub-scaler, the present invention preferentially decides whether the main picture is a prescribed data broadcast image provided with OSD (on-screen display) data or a normal broadcast image.

Namely, in case that a user command for magnification of the partial area of the main picture is inputted according to a user's key operation via a remote controller or the like (S500), the present invention decides whether the main picture, which is currently displayed on a screen or is to be displayed thereon, corresponds to the prescribed data broadcast image provided with OSD (on-screen display) or the normal broadcast image (S501). In accordance with a result of the decision, the sub-scaler as a main element of the present invention performs magnification on the partial area of the main picture in a manner of enabling a corresponding one of the different data paths and various modules located on the corresponding data path. A case that the main picture corresponds to the normal broadcast image is explained in the first place as follows.

If it is decided that the main picture corresponds to the normal broadcast image in the step S501, a data path for the scaling of the normal broadcast image is selected from a plurality of data paths for the magnification of the partial area of the main picture (S502) and is then enabled (S503). In doing so, the enabling of the data path includes operations of the modules located on the corresponding data path such as an on-to-off or off-to-on switching operation of a prescribed switch.

Once the corresponding data path of the normal broadcast image is enabled in the step S503, the image data belonging to the partial area to be magnified is extracted from full image data of the main picture inputted via the main scaler (S504). And, the full image data of the original and the image data of the partial area to be magnified are outputted, respectively, according to the data path of the normal broadcast image enabled in the step S503 and the image data belonging to the partial area to be magnified is transferred to the sub-scaler via the OSD processor according to the data path (S505).

After the partial area of the main picture has been scaled for magnification in the sub-scaler (S506), the scaled image data is overlaid on the full image data of the original to be externally outputted (S507). Hence, a user is able to view the main picture of which partial area is magnified. Preferably, a predetermined graphic object for additional information display is OSD-processed according to a user's selection (S508) so that the OSD-processed graphic object can be overlaid on the main picture of which partial area is magnified via a prescribed mixer to be outputted (S510).

On the other hand, if it is decided that the main picture corresponds to the data broadcast image in the step S501, a data path for the scaling of the data broadcast image and the respective modules located on the corresponding data path are selected from a plurality of data paths for the magnification of the partial area of the main picture (S511) and are then enabled (S512). And, image information belonging to the partial area to be magnified is extracted from the main picture inputted via the main scaler (S513) to be outputted to the OSD processor (S514). Subsequently, the image data belonging to the partial area to be magnified is synthesized with the prescribed OSD image data included in the data broadcast image via the OSD processor by the path enabling of the data broadcast image (S514) and the synthesized data is then inputted to the sub-scaler (S515). And, the image data belonging to the partial area to be magnified is magnified at the set-up rate in the sub-scaler (S516).

Finally, the image data magnified by the sub-scaler is overlaid on the data broadcast image of the original via the OSD processor to be externally outputted (S517). Hence, a user can view the main picture of which partial area is magnified.

Preferably, a predetermined graphic object for additional information display is OSD-processed according to the user's selection (S508) so that the OSD-processed graphic object can be synthesized with the main picture having the magnified partial area via a prescribed mixer (S509). The synthesized data is outputted (S510) so that a user can easily recognize the magnified area.

Thus, without employing separate expensive hardware, the present invention makes it possible to perform the magnification or reduction on the partial area of the specific picture by changing the data path within the video processor, controlling the activation (enabling) of the data path, and using such a conventional hardware resource as a sub-scaler scaling the sub-picture.

Figure 6A:
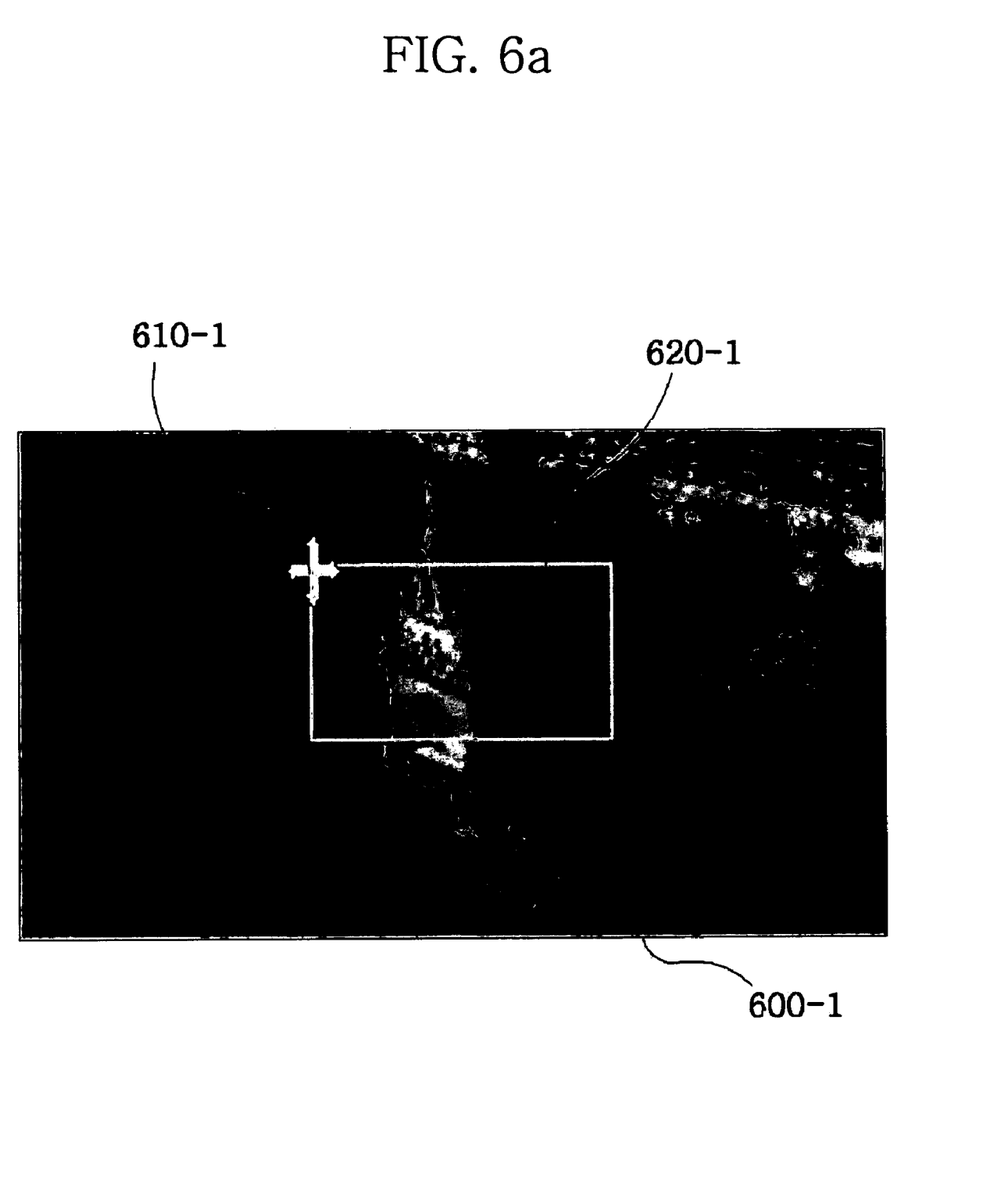
FIG. 6A and FIG. 6B are exemplary diagrams of a partial area magnified by the method according to the present invention.
Figure 6B:
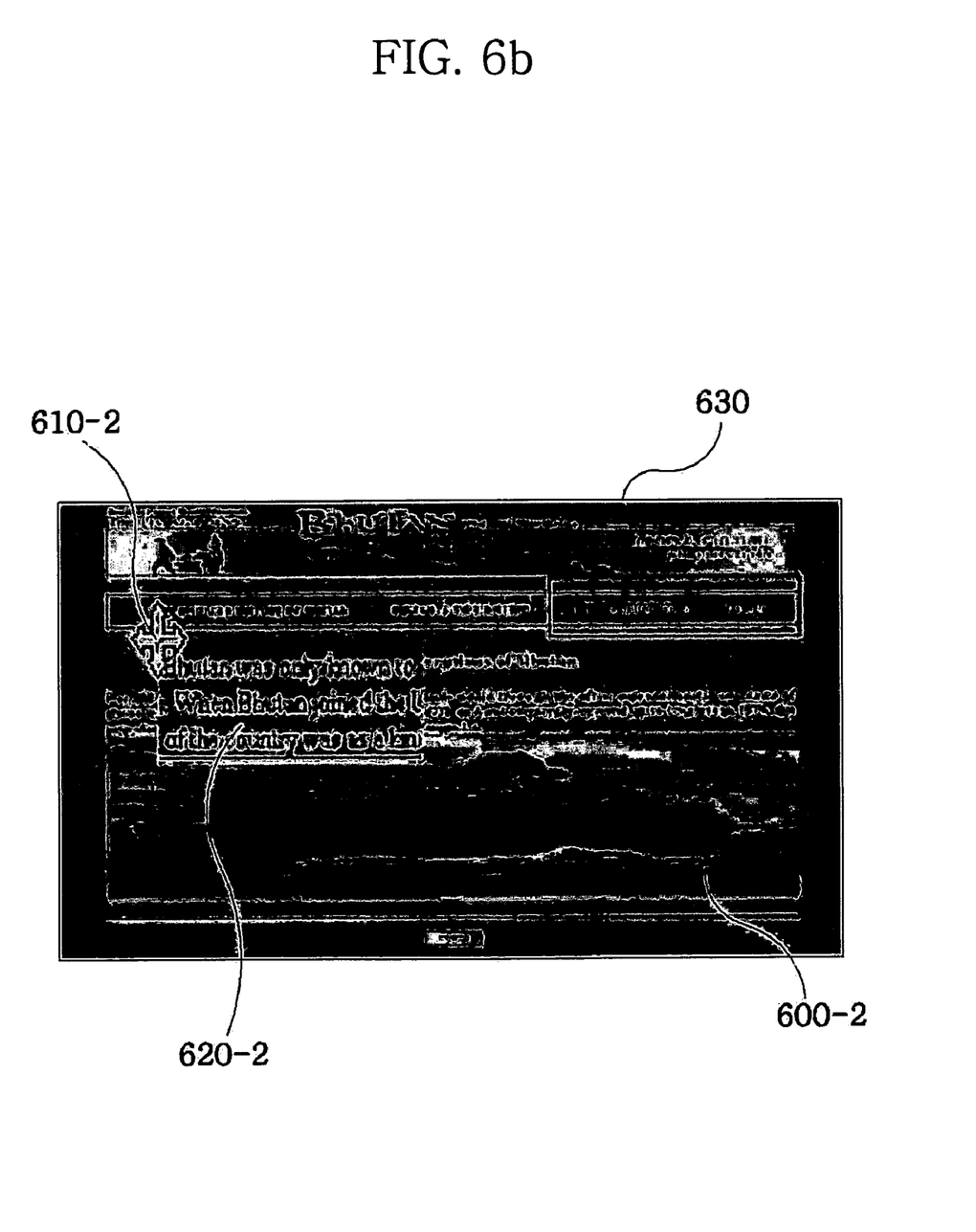

Meanwhile, in FIG. 6A and FIG. 6B, the main picture having the magnified partial area is displayed on the screen. In FIG. 6A, the main picture corresponds to the normal broadcast image. In FIG. 6B, the main picture corresponds to the data broadcast image. Referring to FIG. 6A and FIG. 6B, a reference number 600-1 or 600-2 indicates the main picture, a reference number 610-1 or 610-2 indicates the partial area magnified via the sub-scaler, a reference number 620-1 or 620-2 indicates a previously set graphic object for additional information displayed according to a user's selection, and a reference number 630 indicates a prescribed OSD image included in the data broadcast image. The present invention, as shown in FIG. 6A and FIG. 6B, makes it possible to magnify the partial area of the main picture via the sub-scaler. Hence, a user can view the magnified partial area of the main picture like using a virtual magnifier while viewing the main picture as a full background image.

Accordingly, a method of scaling a partial area of a main picture according to the present invention provides the following effects or advantages.

First of all, magnification or reduction is performed on a specific partial area of a picture by changing a data path within a video processor, controlling the activation of the data path, and using such a hardware resource as a sub-scaler scaling a sub-picture. Hence, the present invention magnifies a specific partial area of the main picture without employing the separate expensive hardware. Therefore, a user can view the magnified partial area of the main picture, as if a virtual magnifier is used, while viewing the main picture as a full-sized background picture.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of scaling a partial area of a main picture, comprising:
    a main scaler extracting image data of the partial area to be scaled from full image data according to prescribed scaling information including magnification/reduction information for the partial area of a display picture;
    a sub-scaler scaling the extracted image data of the partial area at a prescribed rate, wherein one of a plurality of predefined data paths for inputting the extracted image data to the sub-scaler is selected by determining a video mode associated with the display picture, the plurality of predefined data paths associated with a plurality of predefined image modes;
    inputting the extracted image data of the partial area to the sub-scaler via the selected data path; and
    overlaying the scaled image data of the partial area on the full image data provided from the main scaler.

2. The method of claim 1, wherein the main scaler extracting the image data comprises:
    generating the prescribed scaling information according to user setup information; and
    extracting the image data of the partial area to be scaled with reference to the generated prescribed scaling information.

3. The method of claim 2, wherein the main scaler extracting the image data further comprises:
    detecting user setup reference position coordinates from the generated prescribed scaling information;
    setting up the partial area to be scaled by performing a scaling at a prescribed rate centering on the detected reference position coordinates; and
    extracting the image data corresponding to the set-up partial area to be sealed from the full image data.

4. The method of claim 3, wherein setting up the partial area to be scaled further comprises performing the scaling variably according to a user setup rate centering on the detected reference position coordinates.

5. The method of claim 3, wherein setting up the partial area to be scaled further comprises performing the scaling fixedly according to a predefined rate centering on the detected reference position coordinates.

6. The method of claim 1, wherein the sub-scaler scaling the extracted image data further comprises:
    scaling the input image data at the prescribed rate.

7. The method of claim 6, wherein\the sub-scaler scale further comprises scaling font data of the input image data at a predefined font rate.

8. The method of claim 7, wherein the font rate is variable according to a user's setup.

9. The method of one of claim 1, wherein the prescribed scaling information comprises reference position information and scaling rate information related to the partial area to be scaled.

10. The method of claim 1, further comprising blending a predefined graphic object with the image data of the partial area overlaid on the full image data to indicate the scaled partial area after completion of overlaying the scaled image data of the partial area on the full image data provided from the main scaler.

11. The method of one of claim 2, wherein the prescribed scaling information comprises reference position information and scaling rate information related to the partial area to be scaled.

12. The method of one of claim 3, wherein the prescribed scaling information comprises reference position information and scaling rate information related to the partial area to be scaled.

13. The method of one of claim 4, wherein the prescribed scaling information comprises reference position information and scaling rate information related to the partial area to be scaled.

14. The method of one of claim 5, wherein the prescribed scaling information comprises reference position information and scaling rate information related to the partial area to be scaled.

15. The method of one of claim 6, wherein the prescribed scaling information comprises reference position information and scaling rate information related to the partial area to be scaled.

16. The method of one of claim 7, wherein the prescribed scaling information comprises reference position information and scaling rate information related to the partial area to be scaled.

17. The method of one of claim 8, wherein the prescribed scaling information comprises reference position information and scaling rate information related to the partial area to be scaled.

18. The method of claim 2, further comprising blending a predefined graphic object with the image data of the partial area overlaid on the full image data to indicate the scaled partial area after completion of overlaying the scaled image data of the partial area on the full image data provided from the main scaler.

19. The method of claim 3, further comprising blending a predefined graphic object with the image data of the partial area overlaid on the full image data to indicate the scaled partial area after completion of overlaying the scaled image data of the partial area on the full image data provided from the main scaler.

20. The method of claim 4, further comprising blending a predefined graphic object with the image data of the partial area overlaid on the full image data to indicate the scaled partial area after completion of overlaying the scaled image data of the partial area on the full image data provided from the main scaler.

21. The method of claim 5, further comprising blending a predefined graphic object with the image data of the partial area overlaid on the full image data to indicate the scaled partial area after completion of overlaying the scaled image data of the partial area on the full image data provided from the main scaler.

22. The method of claim 6, further comprising blending a predefined graphic object with the image data of the partial area overlaid on the full image data to indicate the scaled partial area after completion of overlaying the scaled image data of the partial area on the full image data provided from the main scaler.

23. The method of claim 7, further comprising blending a predefined graphic object with the image data of the partial area overlaid on the full image data to indicate the scaled partial area after completion of overlaying the scaled image data of the partial area on the full image data provided from the main scaler.

24. The method of claim 8, further comprising blending a predefined graphic object with the image data of the partial area overlaid on the full image data to indicate the scaled partial area after completion of overlaying the scaled image data of the partial area on the full image data provided from the main scaler.

25. A method of scaling a partial area of a main picture, comprising:
a first step of making a main scaler extract image data of the partial area to be scaled from full image data according to prescribed scaling information including magnification/reduction information for the partial area of a display picture;
a second step of deciding that the display picture belongs to which video mode among a plurality of predefined image modes;
a third step of making a sub-scaler scale the extracted image data of the partial area at a prescribed rate in a manner of previously setting up a plurality of data paths for inputting the image data to a sub-scaler to correspond to a plurality of the predefined image modes, respectively, selecting one of the data paths to fit a decision result of the second step, and inputting the extracted image data of the partial area to the sub-scaler via the selected data path; and
a fourth step of overlaying the scaled image data of the partial area on the full image data provided from the main scaler.

26. The method of claim 25, the first step comprising:
a step (1-1) of generating the scaling information according to user setup information inputted from outside; and
a step (1-2) of extracting the image data of the partial area to be scaled with reference to the generated scaling information.

27. The method of claim 26, the step (1-2) comprising:
a step (1-2-1) of detecting user setup reference position coordinates from the generated scaling information;
a step (1-2-2) of setting up the partial area to be scaled by performing a scaling at the prescribed rate centering on the detected reference position coordinates; and
a step (1-2-3) of making the main scaler extract the image data corresponding to the set-up partial area to be scaled from the full image data.

28. The method of claim 27, the step (1-2-2) comprising the step of setting up the partial area to be scaled by performing the scaling variably according to a user setup rate centering on the detected reference position coordinates.

29. The method of claim 27, the step (1-2-2) comprising the step of setting up the partial area to be scaled by performing the scaling fixedly according to a predefined rate centering on the detected reference position coordinates.

30. The method of claim 25, wherein in the second step, a data broadcast image mode or a normal broadcast image mode is included in a plurality of image modes.

31. The method of claim 30, the third step comprising:
a step (3-1) of selecting a corresponding data path previously set up to allow the extracted image data from the main scaler to be inputted to the sub-scaler, in case that the display picture belongs to the normal broadcast image mode as a decision result of the second step; and
a step (3-2) of inputting the extracted image data to the sub-scaler via the selected data path in the step (3-1) to have the sub-scaler scale the inputted extracted data at the prescribed rate.

32. The method of claim 30, the third step comprising:
a step (3-1) of selecting a corresponding data path previously set up to allow the extracted image data from the main scaler in the first step to be inputted to the sub-scaler, in case that the display picture belongs to the normal broadcast image mode as a decision result of the second step;
a step (3-2) of overlaying the extracted data on OSD image data included in the corresponding data broadcast video via the corresponding data path selected in the step (3-1); and
a step (3-3) of extracting the image data of the partial area to be scaled from the overlaid image data in the step (3-2) and making the sub-scaler scale the image data extracted from the overlaid image at the prescribed rate.

33. The method of one of claims 25 to 32, further comprising the step of blending a predefined graphic object with the image data of the partial area overlaid on the full image data to indicate the scaled partial area after completion of the fourth step.

34. The method of one of claims 25 to 32, wherein the scaling information includes reference position information of and scaling rate information of the partial area to be scaled.

* * * * *